US010113096B2

(12) United States Patent
Yuan et al.

(10) Patent No.: US 10,113,096 B2
(45) Date of Patent: Oct. 30, 2018

(54) RESIN COMPOSITION, HEAT-DISSIPATING MATERIAL, AND HEAT-DISSIPATING MEMBER

(71) Applicant: DIC Corporation, Tokyo (JP)

(72) Inventors: Jian-Jun Yuan, Sakura (JP); Hiroshi Kinoshita, Sakura (JP)

(73) Assignee: DIC Corporation, Tokyo (JP)

( * ) Notice: Subject to any disclaimer, the term of this patent is extended or adjusted under 35 U.S.C. 154(b) by 90 days.

(21) Appl. No.: 15/030,674

(22) PCT Filed: Oct. 7, 2014

(86) PCT No.: PCT/JP2014/076828
§ 371 (c)(1),
(2) Date: Apr. 20, 2016

(87) PCT Pub. No.: WO2015/060125
PCT Pub. Date: Apr. 30, 2015

(65) Prior Publication Data
US 2016/0264832 A1 Sep. 15, 2016

(30) Foreign Application Priority Data
Oct. 24, 2013 (JP) ................. 2013-221141

(51) Int. Cl.
C08J 3/00 (2006.01)
B22F 1/00 (2006.01)
C09K 5/14 (2006.01)
C08K 3/22 (2006.01)
C08L 101/00 (2006.01)
C01F 7/02 (2006.01)
C01F 7/44 (2006.01)
C09C 1/40 (2006.01)

(52) U.S. Cl.
CPC ............. C09K 5/14 (2013.01); C01F 7/021 (2013.01); C01F 7/441 (2013.01); C08K 3/22 (2013.01); C08L 101/00 (2013.01); C01P 2002/54 (2013.01); C01P 2004/32 (2013.01); C01P 2004/41 (2013.01); C01P 2004/61 (2013.01); C01P 2006/12 (2013.01); C08K 2003/2227 (2013.01); C08K 2201/005 (2013.01); C09C 1/407 (2013.01)

(58) Field of Classification Search
CPC . C01F 7/021; C01F 7/441; C09K 5/14; C08K 3/22; C08K 2003/2227; C08K 2201/005; C08L 101/00; C01P 2002/54; C01P 2004/32; C01P 2004/41; C01P 2004/61; C01P 2006/12; C09C 1/407
USPC .......................................... 523/457, 1; 524/1
See application file for complete search history.

(56) References Cited

U.S. PATENT DOCUMENTS 4,459,155 A 7/1984 Cayless
5,545,598 A 8/1996 Ogawa et al.
6,524,549 B1 * 2/2003 Mohri ................. C01F 7/02
423/625
2011/0193010 A1 8/2011 Keite-Telgenbuscher et al.
2014/0308489 A1 10/2014 Miyahira et al.

FOREIGN PATENT DOCUMENTS

| CN | 102107898 A | 6/2011 |
|---|---|---|
| JP | 54-149751 A | 11/1979 |
| JP | 06-296084 A | 10/1994 |
| JP | 07-206430 A | 8/1995 |
| JP | 07-206432 A | 8/1995 |
| JP | 07-206433 A | 8/1995 |
| JP | 08-169980 A | 7/1996 |
| JP | 10-158512 A | 6/1998 |
| JP | 2000-044331 A | 2/2000 |
| JP | 2001-226117 A | 8/2001 |
| JP | 2001-247767 A | 9/2001 |
| JP | 2001-302235 A | 10/2001 |
| JP | 2001-302236 A | 10/2001 |
| JP | 2002-256147 A | 9/2002 |
| JP | 2003-064269 A | 3/2003 |
| JP | 2004-006993 A | 1/2004 |
| JP | 2005-290076 A | 10/2005 |
| JP | 2006-188670 A | 7/2006 |
| JP | 2008-127257 A | 6/2008 |
| JP | 2008-144094 A | 6/2008 |
| JP | 2012-504668 A | 2/2012 |
| JP | 2012-121793 A | 6/2012 |
| WO | WO-2005/054550 A1 | 6/2005 |
| WO | 2012/150661 A1 | 11/2012 |
| WO | 2013/047203 A1 | 4/2013 |

OTHER PUBLICATIONS

Search Report dated Apr. 19, 2017, issued for the European patent application No. 14855273.0.
International Search Report dated Nov. 4, 2014, issued for PCT/JP2014/076828 and English translation thereof.
Office Action dated Dec. 1, 2015, issued for the Japanese patent application No. 2015-543786 and English translation thereof.
Office Action dated Oct. 11, 2016, issued for the Japanese patent application No. 2016-104207 and English ranslation thereof.
Office Action dated Nov. 21, 2016, issued for the Chinese patent application No. 201480057770.8 and an English translation of the search report.

* cited by examiner

Primary Examiner — David T Karst
(74) Attorney, Agent, or Firm — Locke Lord LLP; James E. Armstrong, IV; Nicholas J. DiCeglie, Jr.

(57) ABSTRACT

The present invention provides a resin composition including aluminum oxide (A) containing molybdenum having a size on the order of μm or less and a resin (B); and a resin molded body formed by molding the resin composition. Also, the present invention provides a heat-dissipating material containing the resin composition; and a heat-dissipating member containing the resin molded body. The heat-dissipating member of the present invention can be used for electronic parts such as electronic devices, electric devices, OA devices or for LED illumination.

20 Claims, No Drawings

RESIN COMPOSITION, HEAT-DISSIPATING MATERIAL, AND HEAT-DISSIPATING MEMBER

TECHNICAL FIELD

The present invention relates to a resin composition having excellent heat dissipation, a resin molded body, a heat-dissipating material, and a heat-dissipating member.

BACKGROUND ART

In recent years, electronic devices including personal computers, televisions, mobile phones, or the like, as representative examples, are developed rapidly and the development progresses with the aim for obtaining the devices with higher density, high output, and light weight. As the performance of the electronic devices is increased, the heat generated per unit area is increased. If the electronic devices are placed in a high temperature environment for a long period of time, an operation becomes unstable and causes a malfunction, a decrease in the performance, or a failure. Thus, a need for dissipating the generated heat more efficiently is increased.

Thermal management is set also with respect to an illumination apparatus using a light emitting diode (LED) as a light source, of which the demand has been drastically increased because the LED has a long life, low electrical power consumption, and a low environmental load as compared with an incandescent lamp or a fluorescent lamp. So far, a metal material or a ceramic material has been mainly used for a member requiring high heat dissipation. However, for decreasing the size of electric-electronic parts, the metal material or the ceramic material suitable has difficulty in decreasing the weight or molding workability and has been being replaced with a resin material.

A thermoplastic resin is easy to mold and has excellent appearance, economical properties, and mechanical strength, in addition to excellent physical and chemical properties. However, since the resin-based material generally has low thermal conductivity, it has been studied to blend a thermal conductive filler in the thermoplastic resin to increase thermal conductivity.

Also, a curable resin is a material which has been widely used for an electrical insulating material, a semiconductor encapsulating material, a fiber reinforced composite material, a coating material, a molding material, and an adhesive material. Among these purposes, in particular, heat dissipation is required in the adhesive, the semiconductor encapsulating material, the electrical insulating material, and the printed circuit board material, and it has been studied to blend a thermal conductive filler in the curable resin to increase thermal conductivity.

As one of the thermal conductive fillers used, aluminum oxide having a size on the order of is used. Aluminum oxide has various crystalline forms such as $\alpha$, $\beta$, $\gamma$, $\delta$, and $\theta$, but it is known that aluminum oxide having an $\alpha$ crystalline form has the highest thermal conductivity. However, in general, since aluminum oxide having an $\alpha$ crystalline form has a plate shape or an irregular shape, a problem of increasing viscosity occurs, and it is not possible to incorporate a large amount of the aluminum oxide, even if it is intended to incorporate a large amount of the aluminum oxide into an organic polymer compound in order to obtain high thermal conductivity.

In order to incorporate a large amount of aluminum oxide, in general, as the thermal conductive filler, into the organic polymer compound, spherical aluminum oxide particles are used, PTL 1 discloses a method for manufacturing an epoxy resin composition for semiconductor encapsulation using spherical aluminum oxide particles (spherical alumina), and PTL 2 discloses spherical alumina powders and a resin composition. However, in general, the spherical aluminum oxide particles are aluminum oxide particles having a $\theta$ crystalline form or $\delta$ crystalline form from the aspect of its manufacturing method, which have low thermal conductivity and, and therefore, a high thermal conductivity comparable to that of aluminum oxide having an $\alpha$ crystalline form cannot be exhibited.

PTL 3 discloses a method for manufacturing an octahedral or higher, that is, polyhedral $\alpha$-alumina, which is calcined with a fluorine compound, or a fluorine compound and a boron compound; and the alumina can be used as a filler for heat dissipation. However, PTL 3 does not disclose the purity or the thermal conductivity of the obtained polyhedral $\alpha$-alumina. PTL 4 discloses a resin composition and a rubber composition in which two types of alumina from various types of alumina are used in a particular ratio, and the various types of alumina available in an industrial scale include alumina powders composed of polyhedral primary particles having a particular particle distribution and substantially not having a fracture, alumina by a Bayer's process, electro-melted alumina, and alumina by a hydrolysis method of an organic metal, and that the high thermal conductivity appears to be obtained under the particular blending conditions.

PTL 5 discloses a thermal conductive pressure-sensitive adhesive composed of an acrylic polymer having a high molecular weight as a main polymer and aluminum oxide, in which 95% by weight or more of the aluminum oxide is $\alpha$-aluminum oxide. PTL 5 discloses that, with respect to the aluminum oxide, a particle shape and essentially has only an $\alpha$ crystal, and the aluminum oxide having a particular inner structure, a particular crystallinity, a particular shape factor, or a particularly regular or irregular appearance is basically not important, and does not define the details of $\alpha$-aluminum oxide.

In addition, as a thermoplastic resin composition, PTL 6 discloses a resin composition in which $\alpha$-alumina in a particular amount is blended with a polyphenylene sulfide resin having a particular melt viscosity. However, PTL 6 only discloses that spherical alumina is preferable as the $\alpha$-alumina, but the details of the $\alpha$-alumina are not disclosed. Also, PTL 7 discloses a resin composition composed of polyphenyiene sulfide, alumina of which the $\alpha$ crystal particle size is less than 5 μm, and a plate-shaped filler. However, PTL 7 only discloses a ratio of the average particle size of the alumina to the $\alpha$ crystal particle size, but the details of the $\alpha$-alumina are not disclosed.

PTL 8 discloses a resin composition including a polyphenyiene sulfide resin and two types of a alumina having a particular size of $\alpha$ crystal particle size, in which one or both of the two types of $\alpha$ alumina are a alumina pre-treated with a coupling agent. However, PTL 8 only discloses the $\alpha$ crystal particle size, but the details of the $\alpha$ alumina are not disclosed.

In any of a curable resin type and a thermoplastic resin type, it is necessary to incorporate a large amount of the aluminum oxide having a size on the order of μm as a filler in order to obtain a resin composition having high thermal conductivity. In order to incorporate a large amount of the aluminum oxide, in general, spherical alumina is used, but since this is the $\alpha$-alumina including many $\theta$ or $\delta$ crystals, a sufficient thermal conductivity is not obtained.

In addition, in general, the thermal conductivity of aluminum oxide is greatly affected by its purity, those skilled in the art considers that a filler having an aluminum oxide component in a low amount does not exhibit a high thermal conductivity, and it is necessary to highly purify a raw material to be used and/or a product in order to obtain a highly pure aluminum oxide. Therefore, there is a problem in that the cost of the filler obtained by having gone through this refinement step is increased, or the like.

CITATION LIST

Patent Literature

[PTL 1] JP-A-2005-290076
[PTL 2] JP-A-2001-226117
[PTL 3] JP-A-2008-127257
[PTL 4] JP-A-8-169980
[PTL 5] JP-T-2012-504668
[PTL 6] JP-A-10-158512
[PTL 7] JP-A-2002-256147
[PTL 8] JP-A-2001-247767

SUMMARY OF INVENTION

Technical Problem

Taking the above situation into consideration, a problem to be solved by the present invention is to provide a resin composition including aluminum oxide containing molybdenum and having a size on the order of μm or less, which is new and useful as a highly thermal conductive filler, and a resin; the resin composition and a resin molded body; and a heat-dissipating material and a heat-dissipating member including the resin composition and the resin molded body.

Solution to Problem

As a result of thorough research, in order to solve the problem, the present inventors found that a resin cured product or a resin molded product of a resin composition including aluminum oxide (A) containing molybdenum and having a size on the order of μm or less and a resin (B) shows considerably high thermal conductivity compared to the same resin cured product or resin molded product including aluminum oxide in the related art, thereby completing the present invention.

In other words, the present invention provides a resin composition including aluminum oxide (A) containing molybdenum and having a size on the order of μm or less and a resin (B); and a resin molded body.

Also, the present invention provides a heat-dissipating material including the resin composition and a heat-dissipating member including the resin molded body.

Advantageous Effects of Invention

Since the resin composition of the present invention includes aluminum oxide containing molybdenum and having a size on the order of μm or less as a filler of the resin, in a case where the resin composition is cured or molded, a particularly remarkable technical effect is exhibited, in which a resin cured product or a resin molded product having high thermal conductivity can be provided compared to aluminum oxide which is commercially available or well-known and commonly used in Patent Documents.

Since a molded body obtained by molding this resin composition and a heat-dissipating member including the molded body have excellent thermal conductivity, a particularly remarkable technical effect is exhibited in which heat is not accumulated in the molded body and heat-dissipating member and they have excellent heat dissipation ability.

DESCRIPTION OF EMBODIMENTS

<Aluminum Oxide (A) Containing Molybdenum>

The thermal conductive filler used in the present invention is aluminum oxide (A) containing molybdenum and having a size on the order of μm or less. A size on the order of μm or less means that the average particle size is 1,000 μm or less, and includes the μm area of 1 to 1,000 μm and the nm area of less than 1,000 nm. Hereinafter, aluminum oxide (A) containing molybdenum and having a size on the order of μm or less is simply referred to as aluminum oxide (A) used in the present invention.

In general, it is known that aluminum oxide having higher purity shows higher thermal conductivity. It is because that an impure component causes phonon to scatter and decreases the thermal conductivity. It is surprising that the resin composition of the present invention and the resin molded body thereof show high thermal conductivity, and the aluminum oxide (A) used in the present invention and containing molybdenum, contains molybdenum, further contains impurities derived from a raw material in some cases, and shows high thermal conductivity although the aluminum oxide component is low, which is the greatest feature.

It is possible to determine whether or not an unknown aluminum oxide corresponds to the aluminum oxide (A) used in the present invention, for example, by whether the unknown aluminum oxide is colored or not. The aluminum oxide (A) used in the present invention is not a white particle of general aluminum oxide, but is dark blue, which is closer to black than light blue, and as the content of molybdenum increases, the color thereof becomes darker. Also, in a case where a small amount of other metals are mixed therein, for example, mixed with chromium causes the color to become red, mixed with nickel causes the color to become yellow, and aluminum oxide (A) used in the present invention is a colored particle, which is not white.

As long as the aluminum oxide (A) used in the present invention contains molybdenum, the aluminum oxide may be obtained based on any manufacturing method. The aluminum oxide can be obtained by pulverizing aluminum oxide containing molybdenum and having a large size on the order of mm or more to have a size on the order of μm, but a significant amount of energy is necessary to obtain the aluminum oxide, or a particle size distribution becomes broad, which is not preferable.

Therefore, from a viewpoint that the particle size distribution can be sharpened without classification, or the like, the thermal conductivity becomes more excellent, and the productivity becomes more excellent, the aluminum oxide is preferably aluminum oxide obtained in the step of calcining an aluminum compound (C) in the presence of a molybdenum compound (D). In other words, specifically, in the calcining step, the aluminum oxide used in the present invention preferably has a step of forming aluminum molybdate (E) by reacting the molybdenum compound (D) and the aluminum compound (C) at high temperature, and further a step of decomposing the aluminum molybdate (E) into aluminum oxide and molybdenum oxide at a higher temperature. In these steps, the molybdenum compound is incorporated into the aluminum oxide particles, and the aluminum oxide becomes a highly pure crystal of which the particle size and the shape are controlled. Hereinafter, this manufacturing method is referred to as a flux method. This flux method will be described in detail.

In e aluminum oxide (A) used in the present invention, the shape, the size, the specific surface area, or the like can be control led by selecting the ratio of using the aluminum compound (C) and the molybdenum compound (D) calcination temperature, and calcination time.

The aluminum oxide (A) used in the present invention may be in various crystalline forms, for example, β, γ, δ, or the like, and basically, is preferably in an α crystalline form from a viewpoint of obtaining more excellent thermal conductivity. In general, the crystal structure of the α type-aluminum oxide is a dense hexagonal lattice, and thermodynamically, the most stable crystal structure is a plate shape in which a plane [001] is developed. However, in the flux method described below, the aluminum compound (C) is calcined in the presence of the molybdenum compound (D), and thus the molybdenum compound (D) acts as a flux agent, the aluminum oxide (A) with high degree of α crystallization and crystal planes other than the plane [001] as the main crystal plane, and among these, aluminum oxide containing molybdenum having a degree of α crystallization of 90% or more can be easily formed. Crystal planes other than the plane [001] as the main crystal plane means that the area of plane [001] is 20% or less with respect to the total area of the fine particles.

The shape of the aluminum oxide (A) used in the present invention is not particularly limited. However, not perfectly spherical but polyhedral particles are advantageous from a viewpoint of easily incorporating the particles into the resin composition. For example, in the flux method described below, by using the molybdenum compound (D) as a flux agent, it is possible to basically obtain the polyhedral particles nearly spherical, and the polyhedral particles nearly spherical have a form useful for incorporating the particles into the resin composition. Among these, particles, in which the area of the largest flat plane is 1/8 or less of the area of the structure and in particular, the area of the largest flat plane is 1/16 or less of the area of the structure, are preferably obtained.

In addition, if the particles are polyhedral particles, when the particles come into contact with each other in the resin composition, it is considered that the plane contact between particles could lead to increased thermal conductivity of resin composition as compared to that of point contact from spherical particles even if the compositions have the same filler loading.

Also, since the aluminum oxide obtained by the generally performed flux method using a large amount of the flux agent is a hexagonal dipyramidal shape and has a sharp edge, a problem such as damage to devices occurs at the time of manufacturing the resin composition. However, since the aluminum oxide used in the present invention is basically not a hexagonal dipyramidal shape, a problem such as damage to devices hardly occurs. Further, since the aluminum oxide of the present invention is basically polyhedral having 8 planes or more and has a shape nearly a spherical shape, a problem such as damage to devices hardly occurs.

The average particle size of the aluminum oxide (A) used in the present invention is not particularly limited, if the average particle size is 1,000 μm or less. However, if it is considered that the aluminum oxide is used as the resin composition, the average particle size thereof is preferably 0.1 μm (100 nm) to 100 μm. If the average particle size of the aluminum oxide (A) used in the present invention is 0.1 μm or more, the viscosity of the resin composition is suppressed to be low, which is industrially preferable. In addition, if the average particle size of the aluminum oxide (A) used in the present invention is 100 μm or less, for example, in the thermoplastic resin composition, roughness hardly occurs on the surface of the molded product thereof, and a satisfactory molded product is easily obtained. Also, for example, in a case or a thermosetting resin composition, adhesiveness of the interface between a cured product and a base material is not reduced, such as a case where the base material and the base material are attached to each other, and crack resistance in a cooling heating cycle or detachability at an attachment interface is excellent, which is preferable. From the same reason as described above, the average particle size of the aluminum oxide (A) used in the present invention is preferably 1 μm to 50 μm.

In addition, for example, the specific surface area of the aluminum oxide (A) used in the present invention obtained from the aluminum compound (C), which is a raw material, by means of the flux method described below, is considerably reduced by calcination compared to the aluminum compound (C). The specific surface area of the aluminum oxide (A) used in the present invention to be obtained varies depending on the physical properties and calcination conditions of the aluminum compound (C), but the specific surface area thereof is within the range of 0.0001 to 50 $m^2/g$, and the aluminum oxide having the specific surface area within the range of 0.001 to 10 $m^2/g$ is appropriately obtained.

In the flux method using the molybdenum compound (D) as a flux agent, most of the molybdenum compound (D) used sublimates by the calcination treatment at a high temperature, but a part of molybdenum remains, and thus aluminum oxide containing molybdenum is obtained. The content of the molybdenum in the aluminum oxide (A) used in the present invention is not particularly limited, and it is preferable to color the aluminum oxide (A) used in the present invention with a light color, in consideration of using the aluminum oxide with an uncolored resin (B) in combination. The content of the molybdenum in the aluminum oxide (A) used in the present invention is preferably 10% by mass or less from the relationship with the degree of coloring (concentration), and the molybdenum having the content of 1% by mass or less obtained by adjusting the calcination temperature, the calcination time, and a sublimation rate of the molybdenum compound is more preferably used.

The presence of molybdenum included in the aluminum oxide (A) used in the present invention is not particularly limited, and examples thereof may include a molybdenum metal, a molybdenum compound such as molybdenum trioxide or a partially reduced molybdenum dioxide, and a form in which a part of aluminum in the aluminum oxide structure is substituted with molybdenum.

<Aluminum Compound (C)>

The aluminum compound (C) of the present invention is a raw material of the aluminum oxide (A) used in the present invention, and is not particularly limited if the compound becomes aluminum oxide by a heating treatment. Examples that can be used include aluminum chloride, aluminum sulfate, basic aluminum acetate, aluminum hydroxide, boehmite, pseudo-boehmite, transition alumina (γ-alumina, δ-alumina, θ-alumina, or the like), α-alumina, and a mixed alumina having at least two types of crystal phases, and physical aspects such as a shape, particle size, and specific surface area of the aluminum compound as a precursor are not particularly limited.

According to the flux method described below, since the shape of the raw material aluminum compound (C) is almost not reflected in the shape of the aluminum oxide (A) used in the present invention, the aluminum oxide can be preferably used even if the aluminum oxide s in any form, for example, a sphere, amorphousness, structure having an aspect (wire, fiber, ribbon, tube, or the like), and sheet.

In the same manner, according to the flux method described below, since the particle size of the aluminum compound (C) is almost not reflected in the aluminum oxide (A) used in the present invention, a solid aluminum compound having a particle size from a few nm to a several hundred µm can be preferably used.

The specific surface area of the aluminum compound (C) is not particularly limited. Since the molybdenum compound effectively acts on the compound, the aluminum compound having a greater specific surface area is preferable, and it is possible to use the aluminum compound having any specific surface area as a raw material, by a sting the calcination conditions or the use amount of the molybdenum compound (D).

In addition, the aluminum compound (C) may be composed of only an aluminum compound or may be a composite of the aluminum compound and an organic compound. For example, an organic/inorganic composite obtained by modifying alumina using organosilane or an aluminum compound composite adsorbed with a polymer can be preferably used. In a case where this composite is used, the content ratio of the organic compound is not particularly limited, and the content ratio is preferably 60% by mass or less and more preferably 30% by mass or less, from a viewpoint of being capable of effectively manufacturing the α type-alumina fine particles to be nearly spherical.

<Molybdenum Compound (D)>

The molybdenum compound (D) used in the present invention may be, for example, molybdenum oxide or a compound containing an oxygen-containing anion formed by a molybdenum metal being bonded to oxygen.

The compound containing an oxygen-containing anion formed by a molybdenum metal being bonded to oxygen is not particularly limited, if the compound can transform to molybdenum trioxide by calcination at a high temperature. Examples that can be preferably used as the molybdenum compound (D) include molybdic acid, hexaammonium heptamolybdate, diammonium molybdate, phosphomolybdic acid, and molybdenum disulfide.

<Calcining>

The aluminum oxide (A) used in the present invention is obtained by calcining the aluminum compound (C) in the presence of, for example, a molybdenum compound (D). As described above, this manufacturing method is referred to as a flux method. Since the aluminum oxide containing molybdenum having a size on the order of µm or less is contained in the resin composition of the present invention, in the manufacturing method of using a large amount of the molybdenum compound (B) as a flux agent and taking a fairly long period of time, aluminum oxide containing molybdenum having a considerable size on the order of mm or more is produced, which is not preferable.

A method of calcination is not particularly limited, and calcination can be performed by a well-known method. If the calcination temperature exceeds 700° C., the aluminum compound (C) and the molybdenum compound (D) are reacted to each other to form aluminum molybdate (E). Further, if the calcination temperature is 900° C. or higher, when the aluminum molybdate (E) is decomposed to be aluminum oxide and molybdenum oxide, the aluminum oxide can be obtained by incorporating the molybdenum compound into the aluminum oxide particles.

The use amount of the aluminum compound (C) and the molybdenum compound (D) in the calcination is not particularly limited, and from a viewpoint of effectively obtaining polyhedral particles nearly a spherical shape and having a high degree of α crystallization, which is preferable as a resin composition, the molar ratio of molybdenum of the molybdenum compound (D) is preferably within a range of 0.03 to 3.0 and further preferably within a range of 0.08 to 0.7 with respect to aluminum in the aluminum compound (C).

In addition, at the time of calcination, the presence of the aluminum compound (C) and the molybdenum compound. (D) are not particularly limited, and the molybdenum compound (C) may exist in the same space where the aluminum compound (C) exists so as to act on the aluminum compound (C). Specifically, both compounds may be in a state of not being mixed or the compounds may be simply mixed by mixing powders therein, mechanically mixed using a pulverizer, mixed using a mortar, or may be mixed in a dried state or a wet state.

The condition of the calcination temperature is not particularly limited, and the condition is appropriately determined depending on the shape and the particle size of the aluminum oxide (A) used in the present invention to be targeted. In general, calcination is performed at a temperature which is equal to or higher than the decomposition temperature of the aluminum molybdate (E), and specifically, the temperature is 900° C. or higher. In particular, in order to effectively obtain the aluminum oxide (A) used in the present invention having polyhedral particles nearly spherical and a degree of α crystallization of 90% or more, calcination at a temperature of 950° C. to 1,100° C. is more preferable and calcination at a temperature of 970° C. to 1,050° C. is the most preferable.

In addition, the calcination temperature is preferable if the highest temperature is 900° C. or higher, which is the decomposition temperature of aluminum molybdate ($Al_2(MoO_4)_3$).

In general, in order to control the shape of the aluminum oxide (A) obtained after calcination, it is necessary to perform calcination at a high temperature, which is 2,000° C. or higher close to a melting point of the aluminum oxide (A). However, calcination at a high temperature is significantly problematic to be industrially applicable from a viewpoint of imposing a burden to calcination furnace or a fuel cost.

The aluminum oxide (A) used in the present invention can be manufactured even at a high temperature such as exceeding 2,000° C. However, by using the flux method, even at a temperature significantly lower than the melting point of the aluminum oxide, which is 1,600° C. or lower, it is possible to form optimal aluminum oxide as a resin composition having high thermal conductivity, which has a polyhedral shape and has a high degree of α crystallization regardless of the shape of the precursor.

In the flux method, even when the highest calcination temperature is within a range of 900° C. to 1,600° C., it is possible to form aluminum oxide particles which have high thermal conductivity, the shape nearly spherical, and a degree of α crystallization of 90% or more at a low cost. Calcining at the highest temperature within a range of 950° C. to 1,500° C. is more preferable and calcination at the highest temperature within a range of 1,000° C. to 1,400° C. is the most preferable.

With regard to the calcination time, the time for increasing the temperature to a predetermined highest temperature is preferably within a range of 15 minutes to 10 hours, and the time for maintaining the temperature at the highest calcination temperature is preferably within a range of 5 minutes to 30 hours. In order to effectively form the aluminum oxide (A) used in the present invention, the time for maintaining calcination is more preferably about 10 minutes to 15 hours.

The atmosphere of calcination is not particularly limited, if the effect of the present invention is obtained. For example, an oxygen-containing atmosphere such as air or oxygen, or an inert atmosphere such as nitrogen or argon gas is preferable, and the air atmosphere is more preferable in a case where costs are considered. A corrosive atmosphere such as halogen gas is not preferable from a viewpoint of safety of a practitioner or durability of the furnace.

An apparatus for calcination is not necessarily limited, and any calcination furnace can be used. The calcination furnace is preferably configured of a material which does not react with the sublimated molybdenum oxide, and a calcination furnace having high sealing properties is preferably used so as to effectively use the molybdenum oxide.

Also, in order to regulate the shape of the crystal of the aluminum oxide (A) used in the present invention or remove impurities on the particle surface, calcination may be further performed at a temperature which is equal to or higher than the temperature at which the aluminum oxide (A) is formed, after the aluminum oxide containing molybdenum is formed.

By mixing the aluminum oxide (A) used in the present invention and the resin (B) as described above, it is possible to prepare the resin composition of the present invention.

<Resin (B)>

The resin (B) used in the present invention may be a polymer, an oligomer, or a monomer. The resin is a thermosetting resin or a thermoplastic resin.

<Thermosetting Resin>

The thermosetting resin used in the present invention is a resin which substantially changes insoluble and infusible when the resin is cured by means of heating, radiation, or a catalyst. For example, the resin is a well-known resin used for a molding material. Specific examples thereof include a novolac type phenol resin such as a phenol novolac resin and a cresol novolac resin; a phenol resin such as a resol type phenol resin including an unmodified resol phenol resin and an oil-modified resol phenol resin, which is modified with tung oil, linseed oil, walnut oil, or the like; a bisphenol type epoxy resin such as a bisphenol A epoxy resin and a bisphenol F epoxy resin; a novolac type epoxy resin such as aliphatic chain modified bisphenol type epoxy resin, a novolac epoxy resin, and a cresol novolac epoxy resin; an epoxy resin such as a biphenyl type epoxy resin and polyalkylene glycol type epoxy resin; a resin having a triazine ring such as an urea resin and a melamine resin; and a vinyl resin such as a (meth)acryl resin and a vinyl ester resin: an unsaturated polyester resin, a bismaleimide resin, a polyurethane resin, a diallyl phthalate resin, a silicone resin, a resin having a benzoxazine ring, and a cyanate ester resin. The resin may be a polymer, an oligomer, or a monomer.

The thermosetting resin may be used with a curing agent. The curing agent used at this time can be used in combination with the thermosetting resin in the well-known way. For example, in a case where the thermosetting resin is an epoxy resin, any compound which is commonly used as a curing agent can be used and examples thereof include an amine-based compound, an amide-based compound, an acid anhydride-based compound, and a phenol-based compound. Specific examples as the amine-based compound include diaminodiphenyl methane, diethyiene triamine, triethylene tetramine, diaminodiphenyl sulfone, isophorone diamine, imidazole, a $BF_3$-amine complex, and a guanidine derivative. Specific examples as the crude based compound include dicyandiamide and a polyamide resin synthesized by a dimer of linolenic acid and ethylene diamine. Specific examples as the acid anhydride-based compound include phthalic anhydride, trimellitic anhydride, pyromellitic anhydride, maleic anhydride, tetranydrophthalic anhydride, methyl tetrahydrophthalic anhydride, methylnadic anhydride, hexahydrophthalic anhydride, and methyl hexahydrophthalic anhydride. Specific examples as the phenol-based compound include a polyhydric phenol compound such as a phenol novolac resin, a cresol novolac resin, an aromatic hydrocarbon formaldehyde resin-modified phenol resin, a dicyclopentadiene phenol-additive type resin, a phenol aralkyl resin (xylok resin), a polyhydric phenol novolac resin synthesized from a polyhydric hydroxy compound represented as a resorcin novolac resin and formaldehyde, a naphthol aralkyl resin, a trimethylolmethane resin, tetraphenylolethane resin, a naphthol novolac resin, a naphthol-phenol co-condensed novolac resin, a naphthol-cresol co-condensed novolac resin, a biphenyl modified phenol resin (polyhydric phenol compound of which phenyl nuclei are linked by a bismethylene group), a biphenyl modified naphthol resin (polyhydric naphthol compound of which phenol nuclei are linked by a bismethylene group), an aminotriazine-modified phenol resin (polyhydric phenol compound of which phenol nuclei are linked by melamine or benzoguanamine), and an alkoxy group-containing aromatic ring modified novolac resin (polyhydric phenol compound in which a phenol nucleus and the alkoxy group-containing aromatic ring are linked by formaldehyde). The curing agent may be used alone or two or more thereof may be used in combination.

The blending amount of the thermosetting resin and the curing agent in the resin composition of the present invention is not particularly limited, and for example, in a case where the curable resin is an epoxy resin, from a viewpoint of obtaining satisfactory properties of a cured product, an active group in the curing agent is preferably used in an amount of 0.7 to 1.5 equivalents with respect to the total 1 equivalent of the epoxy group of the epoxy resin.

In addition, if necessary, a curing accelerator can be appropriately used in combination with the thermosetting resin in the resin composition of the present invention. For example, in a case where the curable resin is an epoxy resin, various accelerators can be used as the curing accelerator, and examples thereof include a phosphorus-based compound, tertiary amine, imidazole, organic metal salts, Lewis acid, and amine complex salts.

In addition, if necessary, a curing catalyst can be used in combination with thermosetting resin of the present invention at an appropriate time, and the well-known thermal polymerization initiator or active energy ray polymerization initiator can be exemplified.

<Thermoplastic Resin>

The thermoplastic resin used in the present invention is the well-known resin used for a molding material, or the like. Specific examples thereof include a polyethylene resin, a polypropylene resin, a polymethylmethacrylate resin, a polyvinyl acetate resin, an ethylene-propylene copolymer, an ethylene-vinyl acetate copolymer, a polyvinyl chloride resin, a polystyrene resin, a polyacrylonitrile resin, a polyamide resin, a polycarbonate resin, a polyacetal resin, a polyethylene terephthalate resin, a polyphenylene oxide resin, a polyphenylene sulfide resin, a polysulfone resin, a polyethersulfone resin, a polyetheretherketone resin, a polyallyl sulfone resin, a thermoplastic polyimide resin, a thermoplastic urethane resin, a polyaminobismaleimide resin, a polyamideimide resin, a polyether imide resin, a bismaleimide triazine resin, a polymethyl pentene resin, a fluorinated resin, a liquid crystal polymer, an olefin-vinylalcohol copolymer, an ionomer resin, a polyallylate resin, an acrylonitrile-ethylene-styrene copolymer, an acrylonitrie-butadiene-styrene copolymer, and an acrylonitrile-styrene copolymer. At least one type of the thermoplastic resin is selected to be used, but two or more types of the thermoplastic resin can be used in combination according to the necessity.

As the resin (B), a combination of the epoxy resin and the curing agent, or the polyphenylene sulfide resin is more preferable from a viewpoint of dimensional stability or heat resistance. Among these, as the resin (B), the combination of the epoxy resin and the curing agent is the most appropriate because the most excellent thermal conductivity as an absolute value can be obtained.

The resin composition of the present invention may contain other blending matters as necessary, and an outer lubricant, an inner lubricant, an antioxidant, a flame retardant, a photostabilizer, an ultraviolet absorber, a reinforcing material such as a glass fiber, or a carbon fiber, a filler, and various coloring agents may be added within a range not impairing the effect of the present invention. Also, a stress lowering agent (stress mitigator) such as a silicone-based compound or a butadiene-based copolymer rubber, for example, silicone oil, liquid rubber, rubber powder, a methyl acrylate-butadiene-styrene copolymer, and a methyl methacrylate-butadiene-styrene copolymer can be used.

The resin composition of the present invention is obtained by mixing the aluminum oxide (A) containing molybdenum and the resin (B), and further other blending matters as necessary. The mixing method is not particularly limited, and they are mixed by the well-known method.

As a general method in a case where the resin (B) is a thermosetting resin, after the thermosetting resin in a predetermined blending amount, the aluminum oxide (A) used in the present invention, and other components as necessary are sufficiently mixed by a mixer, a mixture is kneaded by a triple roll mill to be obtained as a fluid or liquid composition. Alternatively, after the thermosetting resin in a predetermined blending amount, the aluminum oxide (A) used in the present invention, and other components as necessary are sufficiently mixed by a mixer, a mixture is melt-kneaded by a mixing roll mill, an extruder, or the like, and then cooled to be obtained as a solid composition. In a case were the curing agent or a catalyst is blended in the resin composition, it is preferable that the curable resin and these blending matters are sufficiently and uniformly mixed to each other as a mixing state, and it is more preferable that the aluminum oxide (A) used in the present invention is also uniformly dispersed and mixed therein.

As a general method in a case where the resin (B) is a thermosetting resin, a method is exemplified, in which after the thermoplastic resin, the aluminum oxide (A) used in the present invention, and other components as necessary are mixed in advance, using various mixers, for example, a tumbler or Henschel mixer, or the like, a mixture is melt-kneaded by mixers such as Banbury mixer, a roll mill, Brabender a single screw extruder, a twin screw extruder, a kneader, a mixing roll mill, or the like. In addition, the temperature of melt-kneading is not particularly limited, and is generally in a range of 240° C. to 320° C.

When preparing the resin composition of the present invention, a mixing ratio of the aluminum oxide (A) used in the present invention and a nonvolatile component of the resin (B) is not particularly limited, and is preferably selected from a range of 66.7 to 90 parts per 100 parts of the nonvolatile component of the resin (B) in terms of mass. Also, the content of the aluminum oxide (A) used in the present invention in the resin composition of the present invention is not particularly limited, and the aluminum oxide is mixed according to the degree of the thermal conductivity required for each purpose, but the content of the aluminum oxide (A) used in the present invention is preferably 30 to 90 parts by volume with respect to 100 parts by volume of the resin composition.

If the content of the aluminum oxide (A) used in the present invention is less than 30 parts by volume, it is not preferable since the thermal conductivity of resin cured product or the resin molded product becomes insufficient. Meanwhile, if the content of the aluminum oxide (A) used in the present invention exceeds 90 parts by volume, for example, in a case where the resin composition is used to attach the base materials to each other such as a metal, adhesiveness between the cured product and the base material is insufficient and thus electronic parts are greatly warped, crack or peeling of the electronic parts occurs under a cooling heating cycle, or peeling occurs at the attachment interface, which is not preferable. In addition, if the content of the aluminum oxide used in the present invention exceeds 90 parts by volume, viscosity of the resin composition is increased and thus coatability or workability is decreased, which is not preferable. In order for the aluminum oxide (A) used in the present invention to effectively exhibit a function as a thermal conductive filler and obtain high thermal conductivity, it is preferable to be highly filled with the aluminum oxide (A) used in the present invention and 40 to 90 parts by volume is preferably used. In a case of a curable resin composition, 60 to 85 parts by volume is more preferably used in consideration of fluidity of the resin composition.

As the aluminum oxide (A) used in the present invention, it is preferable to use the two or more types of the aluminum oxide having a different particle size, or a mixture of these types of the aluminum oxide mixed in advance, at the time of preparing the resin composition. By doing this, since the aluminum oxide (A) used in the present invention having a small particle size is packed into a gap of the aluminum oxide (A) used in the present invention having a large particle size so as to be densely filled, rather than a case where the aluminum oxide (A) used in the present invention having a single particle size is used, it is possible to show a higher thermal conductivity. For example, it is preferable to use the aluminum oxide (A) used in the present invention having the average particle size of 5 to 20 μm (large particle size) and the aluminum oxide (A) used in the present invention having the average particle size of 0.4 to 1.0 μm (small particle size) in combination from the above reason, and more specifically, if the aluminum oxide (A) used in the present invention having the average particle size of 5 to 20 μm (large particle size) within a ratio of 45% to 75% by mass and the aluminum oxide (A) used in the present invention having the average particle size of 0.4 to 1.0 μm (small, particle size) within a ratio of 25% to 55% by mass are used in combination, an effect in which the thermal conductivity is less dependent on the temperature is obtained.

As the aluminum oxide (A) to be used in the present invention may be those subjected to surface treatment, and an aluminum oxide of which surface is modified with a coupling agent, for example, a silane-based, a titanate-based, or aluminate-based coupling agent may be used.

In order to further increase fluidity of the resin composition or thermal conductivity of the resin molded product or the resin cured product, there are many cases where it is preferable to use the aluminum oxide (A) defined above in the present invention of which the surface is further treated with the coupling agent. For example, adhesion between an organic polymer compound (B) in the resin molded product or the resin cured product and the aluminum oxide (A) to be used in the present invention is further increased by surface treatment, and interface thermal resistance between organic polymer compound. (B) and the aluminum oxide (A) used in the present invention is decreased, thereby imp roving thermal conductivity.

Among the coupling agents, a silane-based coupling agent is preferably used. Examples of the silane coupling agent include vinyl trichlorosilane, vinyl triethoxysilane, vinyl trimethoxysilane, γ-methacryloxypropyl trimethoxysilane, β-(3,4-epoxycyclohexyl)ethyl trimethoxysilane, γ-glycidoxypropyl trimethoxysilane, γ-glycyl methoxypropyl methyl diethoxysilane, N-β(aminoethyl) γ-aminopropyl trimethoxysilane, N-β(aminoethyl)γ-aminopropyl methyl dimethoxysilane, γ-aminopropyl triethoxysilane, N-phenyl-γ-aminopropyl trimethoxysilane, γ-mercaptopropyl trimethoxysilane, and γ-chloropropyl trimethoxysilane.

The surface treatment can be performed by the well-known surface modifying method of a filler, for example, a spray method using fluid nozzles, a dry method such as stirring using shearing force, a ball mill, and a mixer, and a wet method such as an aqueous type or an organic solvent type can be adopted. The surface treatment using the shearing force is desirably performed to the aluminum oxide (A) used in the present invention such that the aluminum oxide is not damaged.

The temperature within the system of the dry method or the dry temperature after the treatment by the wet method can be appropriately determined within an area in which a surface treatment agent is not thermally decomposed, according to the type of the surface treatment agent. For example, in a case where the silane coupling agent having an amino group as described above is used for the treatment, the temperature of 80° C. to 150° C. is preferable.

As the aluminum oxide (A) used in the present invention, as described above, two or more types of the aluminum oxide having a different particle size are prepared, each of them is surface-treated with a coupling agent in advance as described above, and then these types of aluminum oxide are used in combination to prepare the resin composition of the present invention, and cured or molded, which is the most preferable, from a viewpoint of causing the obtained cured product or the molded product to have the most excellent thermal conductivity and the temperature dependency to be low.

In order to improve the thermal conductivity, other thermal conductive fillers can be used in addition to the aluminum oxide (A) used in the present invention. As such a thermal conductive filler, the well-known metal-based filler, an inorganic compound filler, a carbon-based filler, or the like can be used. Specific examples thereof include a metal-based fiber such as silver, copper, aluminum, and iron; an inorganic filler such as alumina, magnesia, beryllia, silica, boron nitride, aluminum nitride, silicon carbide, boron carbide, and titanium carbide; and a carbon-based filler such as diamond, black lead, graphite, and a carbon fiber. One or a plurality of types of thermal conductive filler having a different crystalline form, a particle size, or the like can be combined to be used. In a case where the heat dissipation is required for the use of electronic equipment, or the like, since electric insulating properties are required in many cases, among these fillers, a thermal conductive filler selected from alumina having high volume intrinsic resistivity, magnesium oxide, zinc oxide, berililya, silica, boron nitride, aluminum nitride, and diamond is preferably used. As this thermal conductive filler, a surface-treated filler may be used. For example, as the inorganic filler, a filler surface-treated with a silane-based and/or a titanate-based coupling agent can be used.

<Resin Molded Body>

A resin molded body can be obtained by molding the resin composition of the present invention.

The well-known method can be used for obtaining the resin molded body.

For example, in a case where the resin (B) of the present invention is a thermosetting resin, in general, it is preferable to follow a method for curing a thermosetting resin composition such as an epoxy resin composition, but for example, in a case of a resin composition in which the resin (B) is an epoxy resin, it is possible to cure the resin with heat. The heating temperature condition at that time may be appropriately selected depending on the type of the curing agent to be combined or the purpose, and the resin may be heated at a temperature range of about room temperature to 250° C. In a case where an active energy ray curable resin, the resin can be cured and molded by irradiating with active energy rays such as ultraviolet rays and infrared rays.

In addition, in a case where the resin of the present invention is a thermoplastic resin, a molded product can be obtained by molding in the conventional way. Examples thereof include an injection molding method, an ultrahigh speed injection molding method, an injection compression molding method, a two-color molding method, a hollow injection molding method such as gas assist, a molding method using a heat insulation mold, a molding method using a rapidly heated mold, foam molding (including supercritical fluid), insert molding, in-mold coating molding (IMC) molding method, an extrusion molding method, a sheet forming method, a rotational molding method, a laminate molding method, and a press molding method. Also, a molding method using a hot runner system can be used. The shape, form, color, and size of the molded article are not limited, and may be arbitrarily set depending on the purposes of the molded article.

The resin composition of the present invention can be used as so-called a thermal interface material (TIM) for attaching the base material to the base material, a material for improving the thermal conductivity at the interface between the base materials, or a heat-dissipating part in the form of a resin cured product or a resin molded product.

For example, the resin composition can be used as an adhesive used for exhibiting the satisfactory heat dissipation by attaching a part of the electric or electronic equipment such as a power module to be heat-dissipated to a heat-dissipating member (for example, a metal plate or heat sink). The form of the resin composition used at that time is not particularly limited, and in a case where the resin composition is designed in a liquid or paste form, the liquid or pasty resin composition may be injected into the interface of the attachment surface, and then attached and cured. In a case where the resin composition is designed in a solid form, a powder-, chip- or sheet-shaped composition may be placed on the interface of the attachment surface, and then attached and cured.

In addition, the resin composition of the present invention can be used for a resin substrate such as a printed circuit board and is useful as a resin heat-dissipating substrate material.

In addition, the resin composition of the present invention can be used after molding the composition into heat-dissipating parts made of a resin such as a heat sink and is useful as a heat-dissipating material such as an LED.

EXAMPLES

Hereinafter, the present invention will be described in detail using Examples and the present invention is not limited to these Examples. In addition, "%" refers to "% by mass" unless otherwise mentioned.

[Shape Analysis of Aluminum Oxide (A) Containing Molybdenum and Having a Size on the Order of μm or Less by Means of Scanning Electron Microscope]

A sample was fixed to a sample support with a double sided tape and the sample was observed by a surface observation apparatus VE-9800 manufactured by KEYENCE CORPORATION. 100 particles were randomly selected from the aluminum oxide particles containing molybdenum confirmed by a scanning electron microscope, the maximum size of these aluminum oxide particles containing molybdenum were measured, and the range of these particle sizes was shown. In addition, the average of the measured values was set to an average particle size.

[Composition Analysis of Aluminum Oxide (A) Containing Molybdenum and Having a Size on the Order of μm or Less by Means of STEM-EDX]

A sample prepared as a cross section was laid on a carbon-deposited copper grid, and composition analysis was performed using a high resolution electron microscope EM-002B, VOYAGER M3055 manufactured by TOPCON CORPORATION and Nolan instruments.

[Analysis of Aluminum Oxide (A) Containing Molybdenum and Having a Size on the Order of μm or Less by Means of X-Ray Diffraction Method]

A fabricated sample was laid on a holder for a measurement sample, the sample was set to a wide angle X-ray diffraction apparatus [Rint-Ultma] manufactured by Rigaku Corporation, and the sample was measured under conditions of a Cu/Kα ray, 40 kV/30 mA, a scan speed of 1.0°/min, and a scanning range of 5° to 80°.

[Measurement of Specific Surface Area of Aluminum Oxide (A) Containing Molybdenum and Having a Size on the Order of μm or Less by Means of BET]

The specific surface area was measured using a Tris star 3000 type apparatus manufactured by Micromeritics Japan by a nitrogen gas adsorption/desorption method.

[Evaluation of Chemical Bonding of α-Alumina Structure by Means of $^{27}$Al-NMR Measurement]

A solid $^{27}$Al single pulse non-decoupling CNMR measurement was performed using JNM-ECA600 manufactured by JEOL Ltd. A chemical shift was determined by an automatic reference setting of the apparatus.

[Composition Analysis of α-Alumina Fine Particles by Means of Fluorescent X Rays]

About 100 mg of the sample was taken in a filter paper and a PP film was overlaid thereon to perform fluorescent X ray measurement (ZSX100e/Rigaku Corporation).

[Calcining]

Calcining was performed using ceramic electric furnace ARF-100K type calcination furnace apparatus with an AMF-2P type temperature controller manufactured by ASAHI RIKA SEISAKUSHO KK.

Synthesis Example 1 <Preparation of Aluminum Oxide Containing Molybdenum>

40 g of γ-alumina (manufactured by Wako Pure Chemical Industries, Ltd., active alumina, average particle size of 45 μm) and 10 g of molybdenum trioxide (manufactured by Wako Pure Chemical Industries, Ltd.) were mixed by a mortar to obtain 50 g of a mixture of γ-alumina and molybdenum oxide. The obtained mixture was put into a crucible and calcined at a temperature of 1,000° C. for 3 hours by a ceramic electric furnace. After the temperature was decreased, the crucible was taken out, the content was washed with 10% ammonia water and ion exchanged water, and then dried at a temperature of 150° C. for 2 hours, thereby obtaining 38 g of blue powders.

It was confirmed by SEM observation that the obtained powders are polyhedral particles of which the particle size is 4 to 6 μm, (average particle size of 5 μm) and the shape is nearly a spherical shape, and which includes a crystal plane other than the plane [001] as the main crystal plane, and the crystal plane having a larger area than that of the plane [001]. The particles had the shape other than the hexagonal dipyramidal shape but were polyhedral particles having an octahedron or higher. Further, as a result of performing XRD measurement, sharp scattering peaks derived from the α-alumina were shown and any crystalline peak other than the α crystal structure was observed. By the solid $^{21}$Al-NMR measurement, only a peak derived from 6-coordinated aluminum of the α crystal was not observed within a range from 15 ppm to 19 ppm. This suggests that the α-alumina having a degree of α crystallization of 100% is formed. Further, it is shown that BET specific surface area is 0.37 m$^2$/g and the particles have a dense particle structure. Also, from the result of fluorescent X ray quantitative analysis, it was confirmed that the obtained particles include 94.7% of aluminum oxide and 3.1% of molybdenum.

Synthesis Example 2 <Preparation of Aluminum Oxide Containing Molybdenum>

50 g of γ-alumina (manufactured by Strem Chemicals Inc., average particle size of 40 to 70 μm) and 50 g of molybdenum trioxide (manufactured by Wako Pure Chemical Industries, Ltd.) were mixed by a mortar. The obtained mixture was calcined at a temperature of 1,000° C. for 5 hours by a ceramic electric furnace. After the temperature was decreased, the crucible was taken out, the content was washed with 10% ammonia water and ion exchanged water, and then dried at a temperature of 150° C. for 2 hours, thereby obtaining 49 g of blue powders.

It was confirmed by SEM observation that the obtained powders are polyhedral particles of which the particle size is 20 to 23 μm (average particle size of 21 μm) and the shape is nearly a spherical shape, and which includes a crystal plane other than the plane [001] as the main crystal plane, and the crystal plane having a larger area than that of the plane [001]. The particles had the shape other than the hexagonal dipyramidal shape but were polyhedral particles having an octahedron or higher. Further, as a result of performing XRD measurement, sharp scattering peaks derived from the α-alumina were shown and a crystalline peak other than the α crystal structure was not observed (a degree of α crystallization of 100%). Further, it is suggested that the BET specific surface area is 0.04 m$^2$/g and the particles have a dense particle structure. Also, from the result of fluorescent X ray quantitative analysis, it was confirmed that the obtained particles include 95.8%, of aluminum oxide and 2.1% of molybdenum.

Synthesis Example 3 <Preparation of Aluminum Oxide Containing Molybdenum>

30 g of aluminum hydroxide (manufactured by Wako Pure Chemical Industries, Ltd., average particle size of 0.2 to 1.0 μm) and 7.5 g of molybdenum oxide (manufactured by Wako Pure Chemical Industries, Ltd.) were mixed by a mortar. The obtained mixture was calcined at a temperature of 1,000° C. for 8 hours by a ceramic electric furnace. After the temperature was decreased, the crucible was taken out, the content was washed with 10% ammonia water and ion exchanged water, and then dried at a temperature of 150° C. for 2 hours, thereby obtaining 19 g of blue powders. It was confirmed by SEM observation that the obtained powders are polyhedral particles of which the particle size is 2 to 3 μm. (average particle size of 2.3 μm) and the shape is nearly a spherical shape, and which includes a crystal plane other than the plane [001] as the main crystal plane, and the crystal plane having a larger area than that of the plane [001]. The particles had the shape other than the hexagonal dipyramidal shape but were polyhedral particles having an octahedron or higher. Further, as a result of performing XRD measurement, sharp scattering peaks derived from the α-alumina were shown and a crystalline peak other than the α crystal structure was not observed (a degree of α crystallization of 100%). Further, it is suggested that the BET specific surface area is 1.7 m²/g and the particles have a dense particle structure. Also, from the result of fluorescent X ray quantitative analysis, it was confirmed that the obtained particles include 96.2% of aluminum oxide and 2.5% of molybdenum.

Synthesis Example 4 <Preparation of Surface-Treated Aluminum Oxide Containing Molybdenum>

Aluminum oxide containing molybdenum was synthesized according to the same method as Synthesis Example 1, 20 g of the obtained aluminum oxide containing molybdenum was put into a polyethylene container, 0.1 g of N-phenyl-γ-aminopropyl trimethoxysilane and 1 g of ethanol were added thereto, and the resultant was mixed by shaking using a paint shaker (TOYO SEIKI CO., LTD.) for 30 minutes. After that, the content was taken out on a stainless tray and dried at a temperature of 130° C. for 3 hours by a warm air drier. The obtained aluminum oxide containing molybdenum, surface-treated with N-phenyl-γ-aminopropyl trimethoxysilane, was powders. As a result of fluorescent X ray quantitative analysis, the powders included 98.2% of aluminum oxide and 0.4% of molybdenum. It was confirmed that the powders are polyhedral particles of which the particle size is 4 to 6 μm (average particle size of 5 μm) and the shape is nearly a spherical shape, and which includes a crystal plane other than the plane [001] as the main crystal plane, and the crystal plane having a larger area than that of the plane [001]. The particles had the shape other than the hexagonal dipyramidal shape but were polyhedral particles having an octahedron or higher. The degree of α crystallization and the BET specific surface area were same as those in Synthesis Example 1.

Synthesis Example 5 <Preparation of Surface-Treated Aluminum Oxide Containing Molybdenum>

20 g of the aluminum oxide containing molybdenum obtained in Synthesis Example was surface-treated with N-phenyl-γ-aminopropyl trimethoxysilane according to the same method as Synethsis Example 4 As a result of fluorescent X ray quantitative analysis of the obtained surface-treated aluminum oxide containing molybdenum, the powders included 96.3% of aluminum oxide and 0.9% of molybdenum. It was confirmed that the powders are polyhedral particles of which the particle size is 20 to 23 μm (average particle size of 21 μm) and the shape is nearly a spherical shape, and which includes a crystal plane other than the plane [001] as the main crystal plane, and the crystal plane having a larger area than that of the plane [001]. The particles had the shape other than the hexagonal dipyramidal shape but were polyhedral particles having an octahedron or higher. The degree of α crystallization and the BET specific surface area were same as those in Synthesis Example 2.

Example 1

After 33.6 g of DIC-PPS LR100G (polyphenylene sulfide resin manufactured by DIC CORPORATION, specific weight of 1.35) as a thermoplastic resin and 66.4 g of the aluminum oxide containing molybdenum (specific weight of 4.0) manufactured in Synthesis Example 2 were uniformly dry-blended, and a mixture was melt-kneaded under the conditions of the kneading temperature of 300° C. and the rotation speed of 80 rpm using a resin melt-kneading apparatus Labo Plastomill, thereby obtaining a polyphenylene sulfide resin composition having the filler loading of the aluminum oxide of 40% by volume. The resin composition was easily obtained without a particular problem during kneading by the Labo Plastomill. Next, the obtained resin composition was put into a die to perform heat press molding at a processing temperature of 300° C. to fabricate a press-molded body having the thickness of 1 mm. A sample having a size of 10 mm×10 mm was taken out from the fabricated press-molded body, and the thermal conductivity was measured by using a thermal conductivity measuring apparatus (LFA447nanoflash, manufactured by NETZSCH Japan KK.). The result was 1.2 W/m·K, which is higher than that of the resin composition of Comparative Example 1 by 50%.

Comparative Example 1

After 34.2 g of DIC-PPS DR1000, (polyphenylene sulfide resin manufactured by DIC CORPORATION, specific weight of 1.35) as a thermoplastic resin and 65.8 g of DAW5 (aluminum oxide manufactured by Denka Co. Ltd., a mixture of θ crystalline form and δ crystalline form, and α crystalline form, perfectly spherical shape, average particle size of 5 μm, and specific weight of 3.9) were uniformly dry-blended, and a mixture was melt-kneaded under the conditions of the kneading temperature of 300° C. and the rotation speed of 80 rpm using a resin melt-kneading apparatus Labo Plastomill, thereby obtaining a polyphenylene sulfide resin composition having the filler loading of the aluminum oxide of 40% by volume. Next, the resin composition obtained in the same manner as Example 1 was put into a die to perform heat press molding at a processing temperature of 300° C. to fabricate a press-molded body having the thickness of 1 mm. A sample having a size of 10 mm×10 mm was cut from the fabricated press-molded body, and the thermal conductivity was measured by using a thermal conductivity measuring apparatus (LFA447nanoflash, manufactured by NETZSCH Japan KK.). The result was 0.8 W/m·K.

Example 2

1.50 g of EPICLON EXA-4816 (bifunctional aliphatic chain modified epoxy resin having a long chain hydrocarbon chain and a bisphenol A skeleton, and manufactured by DIC CORPORATION), 2.79 g of SR-8EGS (polyethylene glycol diglycidyl ether type epoxy resin manufactured by Sakamoto Yakuhin Kogyo Co., Ltd.) 0.26 g of AMICURE AH-154 (DICY-based epoxy resin curing agent manufactured by Ajinomoto Fine-techno Co., Inc.), and 24.6 g of the aluminum oxide containing molybdenum manufactured in Synthesis Example 2 were blended and kneaded by a triple roll mill to obtain a resin composition having the filler loading of the aluminum oxide of 39.1% by volume. A test plate having a size of 60×110×0.8 mm was fabricated (temporary curing condition of 170° C.×20 minutes, main curing condition of 170° C.×2 hours) by using the obtained resin composition, a sample having a size of 10×10 mm was cut from the fabricated test plate, and the thermal conductivity was measured by using a thermal conductivity measuring apparatus (LFA447nanoflash, manufactured by NETZSCH Japan KK.). The result was 2.2 W/m·K and the resin composition showed the high thermal conductivity.

Example 3

1.50 g of EPICLON EXA-4816 (epoxy resin manufactured by DIC CORPORATION), 2.79 g of SR-8EGS (epoxy resin manufactured by Sakamoto Yakuhin Kogyo Co., Ltd.), 0.26 g of AMICURE AH-154 (epoxy resin curing agent manufactured by Ajinomoto Fine-techno Co., and 24.6 g of the aluminum oxide) containing molybdenum manufactured in Synthesis Example 3 were blended and kneaded by a triple roll mill to obtain a resin composition having the filler loading of the aluminum oxide of 59.1% by volume. A test plate having a size of 60×110×0.8 mm was fabricated (temporary curing condition of 170° C.×20 minutes, main curing condition of 170° C.×2 hours) by using the obtained resin composition, a sample having a size of 10×10 mm was cut from the fabricated test plate, and the thermal conductivity was measured by using a thermal conductivity measuring apparatus (LFA447nanoflash, manufactured by NETZSCH Japan KK.). The result was 2.1 W/m·K and the resin composition showed the high thermal conductivity.

Example 4

1.50 g of EPICLON EXA-4816 (epoxy resin manufactured by DIC CORPORATION), 2.79 g of SR-8EGS (epoxy resin manufactured by Sakamoto Yakuhin Kogyo Co., Ltd.), 0.26 g of AMICURE AH-154 (epoxy resin curing agent manufactured by Ajinomoto Fine-techno Co., Inc.), and 24.6 g of the aluminum oxide containing molybdenum manufactured in Synthesis Example 5 were blended and kneaded by a triple roll mill to obtain a resin composition having the filler loading of the aluminum oxide of 59.1% by volume. A test plate having a size of 60×110×0.8 mm was fabricated (temporary curing condition of 170° C.×20 minutes, main curing condition of 170° C.×2 hours) by using the obtained resin composition, a sample having a size of 10×10 mm was cut from the fabricated test plate, and the thermal conductivity was measured by using a thermal conductivity measuring apparatus (LEA447nanoflash, manufactured by NETZSCH Japan KK.). The result was 2.7 W/m·K and the resin composition showed the high thermal conductivity.

Example 5

1.50 g of EPICLON EXA-4816 (epoxy resin manufactured by DIC CORPORATION), 2.79 g of SR-8EGS (epoxy resin manufactured by Sakamoto Yakuhin Kogyo Co., Ltd.), 0.26 g of AMICURE AH-154 (epoxy resin curing agent manufactured by Ajinomoto Fine-techno Co., Inc.), 9.8 g of the aluminum oxide containing molybdenum manufactured in Synthesis Example 4, and 14.7 g of the aluminum oxide containing molybdenum manufactured in Synthesis Example 5 were blended and kneaded by a triple roll mill to obtain a resin composition having the filler loading of the aluminum oxide of 59.1% by volume. A test plate having a size of 60×110×0.8 mm was fabricated (temporary curing condition of 170° C.×20 minutes, main curing condition of 170° C.×2 hours) by using the obtained resin composition, a sample having a size of 10×10 mm was cut from the fabricated test plate, and the thermal conductivity was measured by using a thermal conductivity measuring apparatus (LFA447nanoflash, manufactured by NETZSCH Japan KK.). The result was 2.6 W/m·K and the resin composition showed the high thermal conductivity.

Example 6

1.19 g of EPICLON EXA-4816 (epoxy resin manufactured by DIC CORPORATION), 2.21 g of SR-8EGS (epoxy resin manufactured by Sakamoto Yakuhin Kogyo Co., Ltd.), 0.2 g of AMICURE AH-154 (epoxy resin curing agent manufactured by Ajinomoto Fine-techno Co., Inc.), 10 g of the aluminum oxide containing molybdenum manufactured in Synthesis Example 4, and 15 g of the aluminum oxide containing molybdenum manufactured in Synthesis Exam 5 were blended and kneaded by a triple roll mill to obtain a resin composition having the filler loading of the aluminum oxide of 65% by volume. A test plate having a size of 60×110×0.8 mm was fabricated (temporary curing condition of 170° C.×20 minutes, main curing condition of 170° C.×2 hours) by using the obtained resin composition, a sample having a size of 10×10 mm was cut from the fabricated test plate, and the thermal conductivity was measured by using a thermal conductivity measuring apparatus (LFA447nanoflash, manufactured by NETZSCH Japan KK.). The result was 3.0 w/m·K and the resin composition showed the high thermal conductivity.

Comparative Example 2

A resin composition having the filler loading of the aluminum oxide of 59.1% by volume was obtained in the same manner as Example 2 except that 25 g of AO-509 (aluminum oxide manufactured by ADMATECHS Company Limited, a mixture of θ crystalline form and δ crystalline form, perfectly spherical shape, average particle size of 10 μm, and specific weight of 3.7) instead of 24.6 g of the aluminum oxide containing molybdenum manufactured in Synthesis Example 2, 1.67 g of EPICLON EXA-4816, 3.12 g of SR-8EGS, and 0.21 g of AMICURE AH-154 were used. As a result of performing measurement of the thermal conductivity using the obtained resin composition, it was 1.9 W/m·K.

From the above result, it was understood that the aluminum oxide (A) used in the present invention has high heat dissipation compared to the conventional aluminum oxide for heat dissipation, which has a low degree of α crystallization and a perfectly spherical shape. In addition, it can be seen that the use of the aluminum oxide having a large particle size and the aluminum oxide having a small particle size in combination improves the filler loading, and therefore can provide a heat-dissipating member having high thermal conductivity.

INDUSTRIAL APPLICABILITY

The resin composition of the present invention is a resin composition having the excellent thermal conductivity, and the resin molded body formed by molding this resin composition can be used for heat dissipation members for electronic parts such as electronic devices, electric devices, OA devices or for LED illumination.

The invention claimed is:

1. A resin composition comprising:
   aluminum oxide (A) containing molybdenum; and
   a resin (B),
   wherein the aluminum oxide (A) containing molybdenum has an average particle size of 1,000 μm or less; and
   wherein the aluminum oxide (A) containing molybdenum has a main crystal plane other than the plane [001].

2. The resin composition according to claim 1,
   wherein the average particle size of the aluminum oxide (A) containing molybdenum is 0.1 to 100 μm.

3. The resin composition according to claim 2,
   wherein the aluminum oxide (A) containing molybdenum is a polyhedral particle.

4. The resin composition according to claim 2,
   wherein the aluminum oxide (A) containing molybdenum is aluminum oxide having a degree of α crystallization of 90% or more.

5. The resin composition according to claim 2,
   wherein the aluminum oxide (A) containing molybdenum is obtained by calcining an aluminum compound (C) in the presence of a molybdenum compound (D).

6. A resin molded body formed by molding the resin composition according to claim 2.

7. A heat-dissipating material comprising the resin composition according to claim 2.

8. The resin composition according to claim 1,
   wherein the aluminum oxide (A) containing molybdenum is a polyhedral particle.

9. The resin composition according to claim 8,
   wherein the aluminum oxide (A) containing molybdenum is aluminum oxide having a degree of α crystallization of 90% or more.

10. The resin composition according to claim 8,
    wherein the aluminum oxide (A) containing molybdenum is obtained by calcining an aluminum compound (C) in the presence of a molybdenum compound (D).

11. A resin molded body formed by molding the resin composition according to claim 8.

12. A heat-dissipating material comprising the resin composition according to claim 8.

13. The resin composition according to claim 1,
    wherein the aluminum oxide (A) containing molybdenum is aluminum oxide having a degree of α crystallization of 90% or more.

14. The resin composition according to claim 13,
    wherein the aluminum oxide (A) containing molybdenum is obtained by calcining an aluminum compound (C) in the presence of a molybdenum compound (D).

15. A resin molded body formed by molding the resin composition according to claim 13.

16. The resin composition according to claim 1,
    wherein the aluminum oxide (A) containing molybdenum is obtained by calcining an aluminum compound (C) in the presence of a molybdenum compound (D).

17. The resin composition according to claim 16,
    wherein the calcining step includes a step of forming aluminum molybdenum (E) by the reaction of aluminum compound (C) and molybdenum compound (D); and a further step of forming the aluminum oxide (A) containing molybdenum by decomposition of the aluminum molybdenum (E).

18. A resin molded body formed by molding the resin composition according to claim 1.

19. A heat-dissipating member comprising the resin molded body according to claim 18.

20. A heat-dissipating material comprising the resin composition according to claim 1.

* * * * *